US012570393B2

(12) United States Patent (10) Patent No.: US 12,570,393 B2
Molinelli (45) Date of Patent: Mar. 10, 2026

(54) STABILITY AND CONTROL AUGMENTATION SYSTEM ACTUATOR

(71) Applicant: Microtecnica S.r.l., Turin (IT)

(72) Inventor: Dario Molinelli, Carnate (IT)

(73) Assignee: MICROTECNICA S.R.L., Turin (IT)

( * ) Notice: Subject to any disclaimer, the term of this patent is extended or adjusted under 35 U.S.C. 154(b) by 190 days.

(21) Appl. No.: 17/942,637

(22) Filed: Sep. 12, 2022

(65) Prior Publication Data

US 2023/0182888 A1 Jun. 15, 2023

(30) Foreign Application Priority Data

Nov. 17, 2021 (EP) .................................... 21208860

(51) Int. Cl.
B64C 13/40 (2006.01)
F15B 15/14 (2006.01)
(52) U.S. Cl.
CPC .......... B64C 13/40 (2013.01); F15B 15/1428 (2013.01); F15B 15/1447 (2013.01)
(58) Field of Classification Search
CPC .............. F15B 15/1461; F15B 15/1452; F15B 15/1447; F15B 15/1428; B64C 13/40
See application file for complete search history.

(56) References Cited

U.S. PATENT DOCUMENTS 3,136,224 A 6/1964 Escobosa
9,428,262 B2 8/2016 Bihel et al.
9,470,248 B2 10/2016 Paulmann
9,870,004 B2 1/2018 Atkins et al.
10,836,469 B2 11/2020 Artoni et al.
(Continued)

FOREIGN PATENT DOCUMENTS

DE 4435983 A1 * 4/1996 ............. B21C 23/14
DE 10030937 A1 * 1/2002 ............. F15B 1/033
EP 0024284 A2 * 3/1981
(Continued)

OTHER PUBLICATIONS

Machine Translation of EP0024284 (2024) DE-4435983 andKR-102321443 are Attached to Foreign Reference.*
(Continued)

*Primary Examiner* — Nathaniel E Wiehe
*Assistant Examiner* — Daniel S Collins
(74) *Attorney, Agent, or Firm* — CANTOR COLBURN LLP

(57) ABSTRACT

A stability and control augmentation system (SCAS) actuator is operable for actuating a flight control surface of an aircraft. The SCAS actuator includes an actuator housing having a first aperture, a second aperture and a hydraulic chamber therebetween. A piston extends through the actuator housing. Fluid inlets are in fluid communication with regions of the hydraulic chamber. A first end portion of the piston is arranged to slide through the first aperture without a seal between the first end portion and the first aperture. A second end portion of the piston is arranged to slide through the second aperture without a seal between the second end portion and the second aperture. An intermediate portion of the piston is arranged to slide in the hydraulic chamber without a seal between the intermediate portion and the hydraulic chamber.

13 Claims, 2 Drawing Sheets

(56) References Cited

U.S. PATENT DOCUMENTS

| 2020/0278698 A1 | 9/2020 | Vanni et al. |
| 2021/0253223 A1 | 8/2021 | Mezzino et al. |

FOREIGN PATENT DOCUMENTS

| EP | 1565373 | A1 | 8/2005 | |
| KR | 100704999 | B1 | 4/2007 | |
| KR | 102321443 | B1 * | 11/2021 | .............. F04B 43/08 |
| WO | 2004101359 | A1 | 11/2004 | |

OTHER PUBLICATIONS

Machine Translation of DE10030937 is attached to foreign document.*
European Search Report for Application No. 21208860.3, mailed May 2, 2022, 15 pages.
Mundry S M: "Hochdynamischer Hydraulischer Servozylinder", O & P—Oelhydraulik Und Pneumatik: Zeitschrift Fuer Fluidtechnik, Aktorik, Steuerelektronik Und Sensorik, Vereinigte Fachverlage GMBH, DE, vol. 42, No. 9, Sep. 1, 1998, pp. 601-602.

* cited by examiner

STABILITY AND CONTROL AUGMENTATION SYSTEM ACTUATOR

CROSS REFERENCE TO RELATED APPLICATIONS

This application claims priority to European Patent Application No. 21208860.3 filed Nov. 17, 2021, the entire contents of which is incorporated herein by reference.

TECHNICAL FIELD

This disclosure relates to an actuator of a stability and control augmentation system for a flight control surface of an aircraft.

BACKGROUND

A Stability and Control Augmentation System (SCAS) is typically provided to help slightly modify a pilot command to an actuator controlling a flight control surface of an aircraft, in order to counteract small and/or high-frequency vibrations and fluctuations of the flight control surface. The SCAS can therefore provide limited control of the actuator (and therefore of the flight control surface) on top of the pilot commands, e.g. to improve stability of the aircraft.

Stability and Control Augmentation Systems are typically included within the mechanical linkage driving the hydraulic actuators. However, this architecture is relatively massive and complex. Improvements in SCASs are therefore desirable.

SUMMARY

According to this disclosure, there is provided a stability and control augmentation system actuator operable for actuating a flight control surface of an aircraft, wherein the SCAS actuator comprises: an actuator housing comprising a first aperture, a second aperture and a hydraulic chamber between the first aperture and the second aperture; a piston comprising a first end portion extending through the first aperture, an intermediate portion in the hydraulic chamber and a second end portion extending through the second aperture, wherein the piston is arranged for linear motion with respect to the actuator housing; a first fluid inlet in fluid communication with a first region of the hydraulic chamber proximal to the first aperture; a second fluid inlet in fluid communication with a second region of the hydraulic chamber proximal to the second aperture. The first end portion is arranged to slide through the first aperture without a seal between the first end portion and the first aperture, the second end portion is arranged to slide through the second aperture without a seal between the second end portion and the second aperture, and the intermediate portion is arranged to slide in the hydraulic chamber without a seal between the intermediate portion and the hydraulic chamber.

The SCAS actuator is arranged to actuate a flight control surface of an aircraft. The (e.g. piston of the) SCAS actuator may be arranged to actuate the flight control surface in any suitable and desired way. In one embodiment the SCAS comprises a mechanical linkage connected to the (e.g. piston of the) SCAS actuator, wherein the (e.g. piston of the) SCAS actuator is arranged to actuate (e.g. a main actuator for) the flight control surface via the mechanical linkage.

The SCAS actuator is for forming part of a stability and control augmentation system (SCAS) and thus will generally be operable for actuating the flight control surface in addition to a main actuator for the flight control surface. Thus the SCAS actuator may provide a limited adjustment (e.g. up to 6%, 8%, 10%, or 12%) of the actuation provided by the main actuator for the flight control surface.

The SCAS actuator may be arranged in any suitable and desired way with respect to the (e.g. main) actuation system for the flight control surface. For example, the SCAS actuator may be operable to actuate the main or tail rotor of a helicopter. The SCAS actuator may be arranged inside the main actuator system (e.g. of the main or tail rotor) or the SCAS actuator may be arranged in line from the flight control system.

Each actuation system of the aircraft may comprise one or more (e.g. a plurality) of SCAS actuators, e.g. to provide redundancy.

The actuator housing may have any suitable and desired geometry. In one embodiment the actuator housing is substantially azimuthally symmetrical (e.g. cylindrical). In one embodiment the first aperture and the second aperture are defined in opposite ends of the actuator housing. In one embodiment the hydraulic chamber extends between the first aperture and the second aperture. In one embodiment the first aperture and/or the second aperture is circular. In one embodiment the hydraulic chamber has a circular cross-section (e.g. in a plane perpendicular to the main (e.g. cylindrical) axis of the hydraulic chamber. In one embodiment the first aperture and the second aperture are coaxial. In one embodiment the hydraulic chamber is coaxial with the first and/or second aperture.

The actuator housing may have a substantially uniform internal cross section (defined by an inner wall of the actuator housing), e.g. the first aperture, the hydraulic chamber and the second aperture may have substantially the same internal cross section. However, in one embodiment, the hydraulic chamber has an internal cross section that is greater than the internal cross section of (e.g. each of) the first and/or second apertures.

Thus, in one embodiment the hydraulic chamber has a greater radial dimension (e.g. diameter) than the radial dimension (e.g. diameter) of (e.g. each of) the first and/or second apertures. In one embodiment the internal cross sections (and, e.g., radial dimension (e.g. diameter)) of the first and second apertures are substantially equal. This (e.g. step) increase in the radial dimension of the hydraulic chamber (from the first and/or second apertures) helps to provide the internal volume of the first and second regions into which the hydraulic fluid can be supplied.

In one embodiment the first aperture has a cross-section (e.g. in a plane perpendicular to the main (e.g. cylindrical) axis) and/or a radial dimension (e.g. diameter) that is substantially constant with respect to the axial direction (the direction of the main (e.g. cylindrical) axis, i.e. along which the piston moves). Thus, in one embodiment, the first aperture is cylindrical. In one embodiment the first aperture does not include any recesses (e.g. for the location of seals), e.g. the internal wall of the actuator housing defining the first aperture is substantially straight in the axial direction.

In one embodiment the second aperture has a cross-section (e.g. in a plane perpendicular to the main (e.g. cylindrical) axis) and/or a radial dimension (e.g. diameter) that is substantially constant with respect to the axial direction. Thus, in one embodiment, the second aperture is cylindrical. In one embodiment the second aperture does not include any recesses (e.g. for the location of seals), e.g. the internal wall of the actuator housing defining the second aperture is substantially straight in the axial direction.

In one embodiment the hydraulic chamber has a cross-section (e.g. in a plane perpendicular to the main (e.g. cylindrical) axis) and/or a radial dimension (e.g. diameter) that is substantially constant with respect to the axial direction. Thus, in one embodiment, the hydraulic chamber is cylindrical. In one embodiment the hydraulic chamber does not include any recesses (e.g. for the location of seals), e.g. the internal wall of the actuator housing defining the hydraulic chamber is substantially straight in the axial direction.

The piston may have any suitable and desired geometry. In one embodiment the piston is substantially azimuthally symmetrical (e.g. cylindrical). In one embodiment two or more (e.g. all) of the intermediate portion, the first end portion and the second end portion are coaxial with each other. In one embodiment the intermediate portion of the piston comprises a flange, e.g. that extends radially outwards (and, e.g., azimuthally around the circumference of the intermediate portion of the piston), e.g. into the hydraulic chamber. Thus, in this embodiment, the intermediate portion of the piston has a greater radial dimension (e.g. diameter) than the radial dimension (e.g. diameter) of the first and/or second portions. In one embodiment the radial dimension (e.g. diameter) of the first and second end portions is substantially equal.

In one embodiment the cross-section and/or the radial dimension of the first end portion is substantially equal to the internal cross-section and/or the radial dimension of the first aperture. In one embodiment the cross-section and/or the radial dimension of the second end portion is substantially equal to the internal cross-section and/or the radial dimension of the second aperture. In one embodiment the cross-section and/or the radial dimension of the intermediate portion is substantially equal to the internal cross-section and/or the radial dimension of the hydraulic chamber.

In one embodiment the first end portion has a cross-section (e.g. in a plane perpendicular to the main (e.g. cylindrical) axis) and/or a radial dimension (e.g. diameter) that is substantially constant with respect to the axial direction. Thus, in one embodiment, the first end portion is cylindrical. In one embodiment the first end portion does not include any recesses (e.g. for the location of seals), e.g. the external surface of the first end portion is substantially straight in the axial direction.

In one embodiment the second end portion has a cross-section (e.g. in a plane perpendicular to the main (e.g. cylindrical) axis) and/or a radial dimension (e.g. diameter) that is substantially constant with respect to the axial direction. Thus, in one embodiment, the second end portion is cylindrical. In one embodiment the second end portion does not include any recesses (e.g. for the location of seals), e.g. the external surface of the second end portion is substantially straight in the axial direction.

In one embodiment the intermediate portion has a cross-section (e.g. in a plane perpendicular to the main (e.g. cylindrical) axis) and/or a radial dimension (e.g. diameter) that is substantially constant with respect to the axial direction. Thus, in one embodiment, the intermediate portion is cylindrical. In one embodiment the intermediate portion does not include any recesses (e.g. for the location of seals), e.g. the external surface of the intermediate portion is substantially straight in the axial direction.

In one embodiment, substantially the entire surface of the first aperture engages with (e.g. contacts or mates against) the first end portion of the piston, e.g. without a seal therebetween. In one embodiment, substantially the entire surface of the second aperture engages with (e.g. contacts or mates against) the second end portion of the piston, e.g.

without a seal therebetween. In one embodiment, substantially the entire surface of the intermediate portion of the piston engages with (e.g. contacts or mates against) the (internal surface of the actuator housing that defines the) hydraulic chamber, e.g. without a seal therebetween.

Having the piston more substantially fill the hydraulic chamber and/or the apertures of the actuator housing helps to prevent any deformation (e.g. bending) of the piston during use (when it is actuated). The relative geometries of the piston and the actuator housing also helps to provide a more predictable friction between the piston and the actuator housing. These both help to result in a more predictable and reliable behaviour of the SCAS actuator, e.g. compared to conventional SCAS actuators that employ seals and are prone to bending.

In one embodiment the first end portion and the first aperture have a clearance (e.g. difference in radial dimension) of less than 20 microns, e.g. less than 10 microns, e.g. less than 5 microns, e.g. between 2 and 4 microns. In one embodiment the second end portion and the second aperture have a clearance (e.g. difference in radial dimension) of less than 20 microns, e.g. less than 10 microns, e.g. less than 5 microns, e.g. between 2 and 4 microns. In one embodiment the intermediate portion and the hydraulic chamber have a clearance (e.g. difference in radial dimension) of less than 20 microns, e.g. less than 10 microns, e.g. less than 5 microns, e.g. between 2 and 4 microns. It will be appreciated that the clearance of the piston in the actuator housing is less than in conventional SCAS actuators, where it can be on the order of 100 microns, in order to accommodate seals between the piston and the actuator housing.

In one embodiment the first aperture is arranged to engage with (e.g. contact or mate against) the first end portion of the piston such as to substantially seal the first aperture against the first end portion, so to substantially prevent the leakage of hydraulic fluid from the hydraulic chamber (past the first aperture and the first end portion). However, in one embodiment, the first aperture is arranged to engage with (e.g. contact or mate against) the first end portion of the piston such as to allow a (small) leakage of hydraulic fluid from the hydraulic chamber (past the first aperture and the first end portion). This may help to lubricate the first aperture against the first end portion, and help to prevent corrosion of these components.

In one embodiment the second aperture is arranged to engage with (e.g. contact or mate against) the second end portion of the piston such as to substantially seal the second aperture against the second end portion, so to substantially prevent the leakage of hydraulic fluid from the hydraulic chamber (past the second aperture and the second end portion). However, in one embodiment, the second aperture is arranged to engage with (e.g. contact or mate against) the second end portion of the piston such as to allow a (small) leakage of hydraulic fluid from the hydraulic chamber (past the second aperture and the second end portion). This may help to lubricate the second aperture against the second end portion, and help to prevent corrosion of these components.

In one embodiment the intermediate portion of the piston is arranged to engage with (e.g. contact or mate against) the (internal surface of the actuator housing that defines the) hydraulic chamber such as to substantially seal the intermediate portion against the hydraulic chamber, so to substantially prevent the leakage of hydraulic fluid between the first and second regions of the hydraulic chamber (past the intermediate portion and the internal surface of the actuator housing that defines the hydraulic chamber). However, in one embodiment, the intermediate portion of the piston is arranged to engage with (e.g. contact or mate against) the (internal surface of the actuator housing that defines the) hydraulic chamber such as to allow a (small) leakage of hydraulic fluid between the first and second regions of the hydraulic chamber (past the intermediate portion and the internal surface of the actuator housing that defines the hydraulic chamber). This may help to lubricate the intermediate portion of the piston against the internal surface of the actuator housing, and help to prevent corrosion of these components.

The piston is arranged for (e.g. reciprocal) linear motion with respect to the actuator housing. In one embodiment the piston is axially movable, e.g. along the main (e.g. cylindrical) axis of the piston and/or actuator housing.

The first region of the hydraulic chamber, which is proximal to (e.g. between the intermediate portion of the piston and) the first aperture, is arranged to be supplied with hydraulic fluid through the first fluid inlet. In an embodiment, the first region of the hydraulic chamber is defined as the region of the hydraulic chamber that is between the intermediate portion of the piston and the first aperture.

The second region of the hydraulic chamber, which is proximal to (e.g. between the intermediate portion of the piston and) the second aperture, is arranged to be supplied with hydraulic fluid through the second fluid inlet. In an embodiment, the second region of the hydraulic chamber is defined as the region of the hydraulic chamber that is between the intermediate portion of the piston and the second aperture.

Thus, in an embodiment the first and second regions of the hydraulic chamber are opposed fluid chambers either side of the piston.

In an embodiment the first and/or second fluid inlets are fluidically connected to a supply of pressurised hydraulic fluid. In one embodiment the SCAS comprises a valve system (comprising one or more valves) arranged to control the supply of hydraulic fluid to the first and/or second regions (through the respective first and/or second fluid inlets). In one embodiment the valve system is connected to the flight control system and is arranged to receive control signals from the flight control system for controlling operation of the valve system.

In an embodiment, the valve system is operable to supply fluid to one of the first and second regions at the same time as receiving fluid from the other, and vice versa, in order to move the piston in response to a pressure differential across the piston, between the first and second (e.g. opposed) regions, created by the fluid flow controlled by the valve system.

In one embodiment the (e.g. actuator housing of the) SCAS actuator comprises one or more fluid outlets for returning hydraulic fluid, e.g. as a result of (internal) leakage. In one embodiment the (e.g. actuator housing of the) SCAS actuator comprises a first fluid outlet defined in the (e.g. actuator housing of the) SCAS actuator on the opposite side of the first aperture from the first region of the hydraulic chamber. The first fluid outlet may be arranged to return hydraulic fluid that may have leaked through the first aperture from the hydraulic chamber.

In one embodiment the (e.g. actuator housing of the) SCAS actuator comprises a second fluid outlet defined in the (e.g. actuator housing of the) SCAS actuator on the opposite side of the second aperture from the second region of the hydraulic chamber. The second fluid outlet may be arranged to return hydraulic fluid that may have leaked through the second aperture from the hydraulic chamber.

In one embodiment the first and/or second fluid outlets are fluidically connected to one or more return hydraulic lines (e.g. of the hydraulic system that supplies hydraulic fluid to the first and/or second fluid inlets).

In one embodiment the SCAS actuator is a sealed unit. This helps to prevent the external leakage of any (e.g. hydraulic) fluid.

In one embodiment the (e.g. actuator housing of the) SCAS actuator is sealed (e.g. around the first and/or second fluid outlets) to prevent the external leakage of hydraulic fluid, e.g. from any internal leakage of fluid from the hydraulic chamber through the first and/or second apertures past the first and/or second end portions of the piston. In one embodiment the (e.g. actuator housing of the) SCAS actuator comprises one or more static seals around the first and/or second apertures. In one embodiment the first and/or second fluid outlets are sealed in the (e.g. actuator housing of the) SCAS actuator.

In one embodiment the SCAS actuator comprises a linear variable differential transformer (LVDT) arranged to determine the position of the piston of the SCAS actuator. In one embodiment the LVDT is on the opposite side of the first aperture from the hydraulic chamber. In one embodiment the LVDT comprises a magnetic core attached to the first end portion of the piston (e.g. the part that extends through the first aperture). In one embodiment the magnetic core is arranged to be moved by the piston. This helps to enable the position of the piston to be measured by the LVDT. In one embodiment the LVDT comprises a plurality of coils (e.g. mounted on or in the actuator housing) through which the magnetic core is arranged to move.

In one embodiment the first fluid outlet is in fluid communication with (e.g. an internal portion of) the LVDT. In one embodiment the LVDT is sealed (e.g. around the first aperture) against the actuator housing, e.g. by means of one or more static seals (between the LVDT and the actuator housing). Thus, any hydraulic fluid that may leak through the first aperture, as well as any fluid (e.g. oil) in which the LVDT operates, may be contained.

In one embodiment the SCAS actuator comprises a biasing mechanism (e.g. a spring) arranged to bias (e.g. centre) the piston. In one embodiment the biasing mechanism is arranged to act on (bias) the second end portion of the piston (e.g. the part that extends through the second aperture). In one embodiment the biasing mechanism is on the opposite side of the second aperture from the hydraulic chamber.

In one embodiment the second fluid outlet is in fluid communication with (e.g. an internal portion of) the biasing mechanism. In one embodiment the biasing mechanism is sealed (e.g. around the second aperture) against the actuator housing, e.g. by means of one or more static seals (between the LVDT and the actuator housing). Thus, any hydraulic fluid that may leak through the second aperture may be contained. Such hydraulic fluid may also be used to lubricate the biasing mechanism.

The biasing mechanism may comprise any suitable mechanism to bias (e.g. centre) the piston. In one embodiment the biasing mechanism is arranged to bias the piston to a central (middle) point of the hydraulic chamber. Thus, the biasing mechanism may be arranged to exert a biasing force on the piston back towards the centre of the hydraulic chamber when the piston is displaced away from the centre of the hydraulic chamber.

In one embodiment the biasing mechanism comprises one or more (e.g. metal) bellows. In one embodiment the second end portion of the piston extends into (and is arranged to be biased by) the one or more bellows. In this way, the one or more bellows help to not interfere with the movement of the piston.

In one embodiment the one or more bellows are sealed (e.g. around the second aperture) against the actuator housing, e.g. by means of one or more static seals (between the bellow(s) and the actuator housing). In one embodiment the biasing mechanism comprises a first bellows and a second bellows, wherein the second bellows surrounds the first bellows. Such a double bellows system helps to provide extra leakage protection, e.g. in case of failure of the first bellows.

In one embodiment the biasing mechanism comprises a sensor (e.g. a microswitch) arranged to detect the presence (e.g. leakage) of hydraulic fluid. In one embodiment the sensor is between the first bellows and the second bellows. This may be used to indicate failure of the first (inner) bellows.

In one embodiment the second end portion of the piston is arranged to be (suitable for being) connected to a (e.g. main actuator) of a flight control surface (e.g. via a mechanical linkage). For example, the second end portion of the piston may be connected directly. For example, the second end portion may protrude through the biasing mechanism (e.g. to allow for external connection thereto).

In one embodiment the SCAS actuator comprises a connector attached to the second end portion of the piston, wherein the connector is arranged to be (suitable for being) connected to a (e.g. main actuator) of a flight control surface. In one embodiment the connector protrudes through the biasing mechanism (e.g. to allow for external connection thereto). In one embodiment the biasing mechanism is sealed around the connector.

As outlined above, the piston may have a steady-state (e.g. central) position. In an embodiment the piston is (axially) moveable from the steady-state position in a first direction to thereby actuate a (main) actuator (for a flight control surface) in a first actuator direction, and wherein the spool is axially moveable from the steady-state position in a second direction to actuate the (main) actuator in a second actuator direction.

The SCAS actuator and the components thereof may be made from any suitable and desired material(s). In one embodiment one or more of the components of the SCAS actuator (e.g. the actuator housing and/or the piston) are made from stainless steel. In one embodiment one or more of the components of the SCAS actuator (e.g. the actuator housing and/or the piston) are made from a non-stainless metal. It may be possible to manufacture at least some of the components from a non-stainless metal owing to the protection provided by the hydraulic fluid and, e.g., its leakage.

Also according to this disclosure, there is provided a stability and control augmentation system comprising the SCAS actuator as described herein, for actuating a flight control surface of an aircraft. A Also according to this disclosure, there is provided an aircraft comprising the SCAS actuator (and/or the SCAS) as described herein, arranged to actuate a flight control surface of the aircraft.

The aircraft may be any suitable aircraft, and the flight control surface may be any suitable flight control surface. The aircraft may be a helicopter and/or the flight control surface may be a rotor blade of the helicopter. The stability and control augmentation system may allow the helicopter to hover in place, with vibrations and fluctuations of the rotor blades counteracted by the stability and control augmentation system to improve stability of the helicopter's hovering.

BRIEF DESCRIPTION OF DRAWINGS

One or more non-limiting examples will now be described, by way of example only, and with reference to the accompanying figures in which.

DETAILED DESCRIPTION OF DRAWINGS

Figure 1:
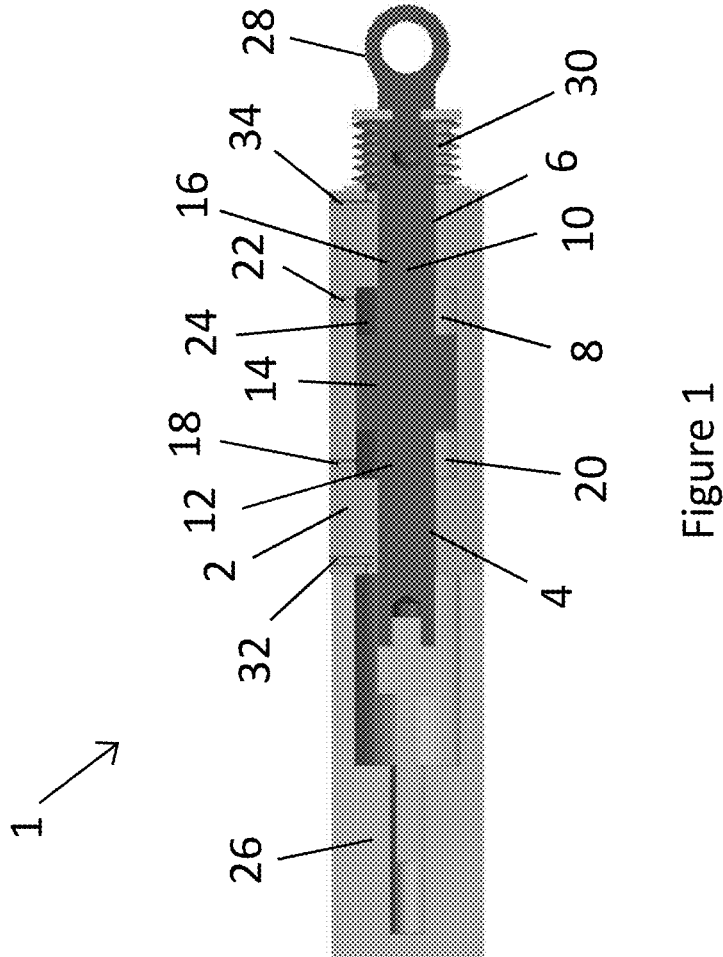
FIG. 1 shows a schematic cross-sectional view of a SCAS actuator.

FIG. 1 shows a schematic cross-sectional view of a SCAS actuator.

The SCAS actuator 1 comprises an actuator housing 2 in which a piston 10 is housed for linear motion within the actuator housing. The housing has apertures 4, 6 at each end through which end portions 12, 16 of the piston extend. The housing has a hydraulic chamber 8 between its apertures, in which an intermediate portion 14 of the piston is located and moves. The end portions 12, 16 of the piston engage with the respective apertures 4, 6 of the actuator housing, with no seals being located between the end portions and the respective apertures. The intermediate portion 14 of the piston engages with the hydraulic chamber 8, with no seal being located between the intermediate portion of the piston and the hydraulic chamber.

The intermediate portion of the piston divides the hydraulic chamber into two regions 20, 24 that are supplied with hydraulic fluid through respective fluid inlets 18, 22. The differential pressure across the two regions 20, 24 of the hydraulic chamber acts to move the piston 10 of the SCAS actuator 1.

The first end 12 of the piston extends through the first aperture 4 of the actuator housing 2. A linear variable differential transformer (LVDT) 26 is attached to the actuator housing 2 and the first end 12 of the piston on the other side of the first aperture 4. The LVDT is used to measure the position of the piston 10 relative to the actuator housing 2. The measured position is used to send feedback signals to a flight control system (FCS) of the aircraft.

The LVDT 26 is sealed against the actuator housing 2 around the first aperture 4. A first return fluid line 32 is in fluid communication with the inside of the LVDT.

The second end 16 of the piston extends through the second aperture 6 of the actuator housing 2. An actuator rod end 28 is mounted onto the second end 16 of the piston. The rod end 28 facilitates connection of the piston 10 to the moving parts of the helicopter, e.g. via a mechanical linkage.

Metal bellows 30 surround the second end 16 of the piston and act to seal the second aperture 6 of the actuator housing 2. A second return fluid line 34 is in fluid communication with the inside of the metal bellows 30.

Figure 2:
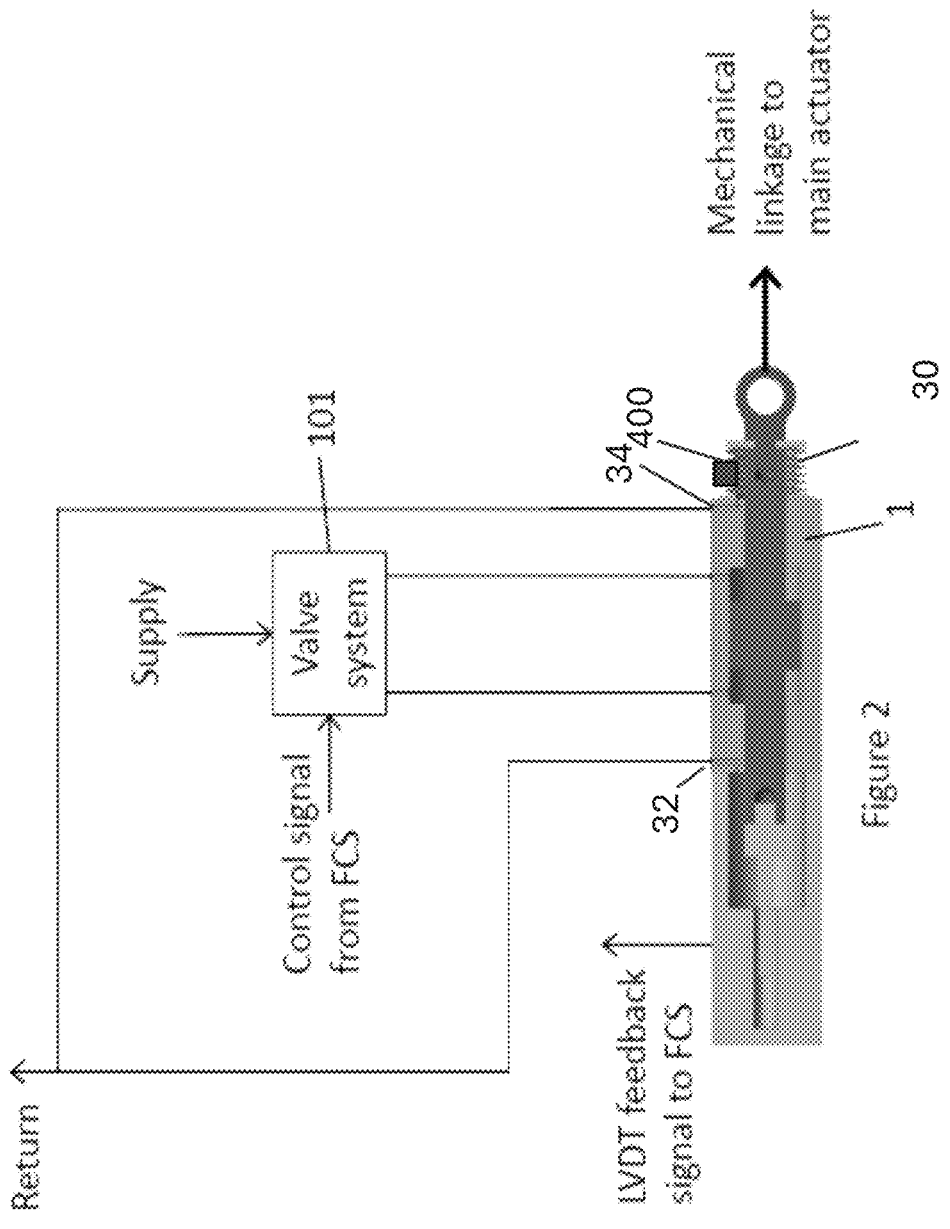
FIG. 2 shows a Stability and Control Augmentation System (SCAS) including the SCAS actuator shown in FIG. 1.

FIG. 2 shows a Stability and Control Augmentation System (SCAS) in which the SCAS actuator 1 shown in FIG. 1 may be implemented. The SCAS provides stability and control augmentation to a flight control surface. The SCAS partially controls operation of an actuator (that, in turn, actuates a flight control surface of an aircraft), via a mechanical linkage from the SCAS actuator 1. The SCAS does this by being operable to modulate (e.g. fractionally adjust) input from an input linkage that is controlled by, e.g., a pilot, to fine-tune operation of the actuator. The SCAS therefore operates in addition to input into the input linkage, to provide adjustment of the actuator, e.g. to counteract vibrations in the actuator or a downstream flight control surface.

The SCAS includes a valve system 101 that controls (e.g. permits or prevents, as needed) a flow of hydraulic fluid (from a hydraulic fluid supply) to the opposed regions 20, 24 of the hydraulic chamber 8 of the SCAS actuator 1, via the respective fluid inlets 18, 22 (see FIG. 1) to thereby control operation of the SCAS actuator 1. The valve system does this by opening and closing fluid flow paths therein, in response to control signals from a flight control system (FCS) of the aircraft.

The position of the SCAS actuator 1 is thereby controlled by controlling operation of the valve system 101. The position of the piston 10 of the SCAS actuator 1 is measured by the LVDT 26 in the SCAS actuator 1. The measured position is used to send feedback signals to the FCS of the aircraft.

A return fluid system is connected to the first and second return fluid lines 32, 34 of the SCAS actuator 1. Hydraulic fluid can thus be returned to the hydraulic fluid system, e.g. following leakage from the first and/or second regions 20, 24 of the hydraulic chamber 8.

Thus the SCAS actuator, in embodiments of the present disclosure, does not possess any seals between the piston and the actuator housing, on the moving surfaces of the piston and the surfaces of the actuator housing that mate with each other and which the piston moves relative to the actuator housing. This helps to provide more predictable friction between the piston and the actuator housing and so gives the SCAS actuator a more predictable and reliable behaviour, e.g. owing to a reduction in the gain of the frequency response from the fly by wire input. This contrasts with conventional SCAS actuators which are trying to stop internal leakage by providing additional seals between the piston and the actuator housing, which further compounds the problem.

The lacks of seals between the piston and the actuator housing also helps to provide controlled internal leakage, e.g. between the first and second regions of the hydraulic chamber, and helps to give a stable frequency response for the SCAS actuator. Not having seals between the piston and the actuator housing also helps to provide a compact SCAS actuator, that has less mass than conventional SCAS actuators, thus helping to give a cost saving design.

The invention claimed is:

1. A stability and control augmentation system actuator operable for actuating a flight control surface of an aircraft, wherein the stability and control augmentation system actuator comprises:

an actuator housing comprising a first aperture, a second aperture and a hydraulic chamber between the first aperture and the second aperture;

a piston comprising a first end portion extending through the first aperture, an intermediate portion in the hydraulic chamber and a second end portion extending through the second aperture, wherein the piston is arranged for linear motion with respect to the actuator housing;

a first fluid inlet in fluid communication with a first region of the hydraulic chamber proximal to the first aperture;

a second fluid inlet in fluid communication with a second region of the hydraulic chamber proximal to the second aperture;

wherein the first end portion is arranged to slide through the first aperture without a seal between the first end portion and the first aperture;

wherein the second end portion is arranged to slide through the second aperture without a seal between the second end portion and the second aperture; and wherein the intermediate portion is arranged to slide in the hydraulic chamber without a seal between the intermediate portion and the hydraulic chamber; and bellows surrounding the second end of the piston and arranged to bias the piston, wherein the bellows are sealed against the actuator housing to seal the second aperture;

the system further comprising:

a first return line in fluid communication with the first region; and a second return line, wherein the second return line is in fluid communication with an inside of the bellows and the first and second return lines are connected together.

2. The stability and control augmentation system actuator as claimed in claim 1, wherein the hydraulic chamber has an internal cross section that is greater than the internal cross section of the first or second apertures; and wherein the intermediate portion of the piston comprises a flange that extends radially outwards into the hydraulic chamber.

3. The stability and control augmentation system actuator as claimed in claim 1, wherein the first aperture has a cross-section that is substantially constant with respect to an axial direction; or wherein the second aperture has a cross-section that is constant with respect to the axial direction; or wherein the hydraulic chamber has a cross-section that is constant with respect to the axial direction.

4. The stability and control augmentation system actuator as claimed in claim 1, wherein the cross-section of the first end portion is equal to the internal cross-section of the first aperture; or wherein the cross-section of the second end portion is equal to the internal cross-section of the second aperture; or wherein the cross-section of the intermediate portion is substantially equal to the internal cross-section of the hydraulic chamber.

5. The stability and control augmentation system actuator as claimed in claim 1, wherein the first end portion has a cross-section that is constant with respect to the axial direction; or wherein the second end portion has a cross-section that is constant with respect to the axial direction; or wherein the intermediate portion has a cross-section that is constant with respect to the axial direction.

6. The stability and control augmentation system actuator as claimed in claim 1, wherein substantially the entire surface of the first aperture engages with the first end portion of the piston; or wherein the entire surface of the second aperture engages with the second end portion of the piston; or wherein the entire surface of the intermediate portion of the piston engages with the hydraulic chamber.

7. The stability and control augmentation system actuator as claimed in claim 1, wherein the first end portion and the first aperture have a clearance of less than 20 microns; or wherein the second end portion and the second aperture have a clearance of less than 20 microns; or wherein the intermediate portion and the hydraulic chamber have a clearance of less than 20 microns.

8. The stability and control augmentation system actuator as claimed in claim 1, wherein the first aperture is arranged to engage with the first end portion of the piston such as to allow a leakage of hydraulic fluid from the hydraulic chamber; or wherein the second aperture is arranged to engage with the second end portion of the piston such as to allow a leakage of hydraulic fluid from the hydraulic chamber; or wherein the intermediate portion of the piston is arranged to engage with the hydraulic chamber such as to allow a leakage of hydraulic fluid between the first and second regions of the hydraulic chamber.

9. The stability and control augmentation system actuator as claimed in claim 1, wherein the stability and control augmentation system actuator comprises a first fluid outlet connected to the first return line and defined in the stability and control augmentation system actuator on the opposite side of the first aperture from the first region of the hydraulic chamber; and wherein the stability and control augmentation system actuator comprises a second fluid outlet connected to the second return line and defined in the stability and control augmentation system actuator on the opposite side of the second aperture from the second region of the hydraulic chamber.

10. The stability and control augmentation system actuator as claimed in claim 1, wherein the stability and control augmentation system actuator comprises a linear variable differential transformer arranged to determine the position of the piston;

wherein the linear variable differential transformer is sealed against the actuator housing.

11. The stability and control augmentation system actuator as claimed in claim 10, wherein the stability and control augmentation system actuator comprises a first fluid outlet defined in stability and control augmentation system actuator on the opposite side of the first aperture from the first region of the hydraulic chamber; and wherein the first fluid outlet is in fluid communication with the linear variable differential transformer.

12. The stability and control augmentation system actuator as claimed in claim 11, wherein the stability and control augmentation system actuator comprises a second fluid outlet defined in the stability and control augmentation system actuator on the opposite side of the second aperture from the second region of the hydraulic chamber.

13. The stability and control augmentation system actuator as claimed in claim 1, the system further comprising a sensor arranged to detect the presence of hydraulic fluid in the bellows.

* * * * *